G. J. OGDEN.
THERMOSTAT.
APPLICATION FILED NOV. 24, 1913.

1,119,190.

Patented Dec. 1, 1914.

WITNESSES.
N. R. Tyndall.
E. P. Hall.

INVENTOR.
G. J. Ogden.
BY J. Edward Maybee
ATTY.

UNITED STATES PATENT OFFICE.

GEORGE J. OGDEN, OF TORONTO, ONTARIO, CANADA.

THERMOSTAT.

1,119,190.  Specification of Letters Patent.  Patented Dec. 1, 1914.

Application filed November 24, 1913. Serial No. 802,770.

*To all whom it may concern:*

Be it known that I, GEORGE J. OGDEN, of the city of Toronto, Province of Ontario, Canada, have invented certain new and useful Improvements in Thermostats, of which the following is a specification.

This invention relates to thermostatic control devices such as shown and described in Canadian Patent Number 127,074, July 26th, 1910, and my object is to devise an improved construction which will be more sensitive, accurate and reliable than the prior construction.

Bi-metallic thermostatic elements though simple, cheap and durable I have found, as ordinarily used, to be defective because they do not give an equal extent of movement for a given rise in temperature at different parts of the thermometric scale and this defect it is my aim to overcome. I have also found that to obtain accurate results it is absolutely necessary to reduce friction and the possibilities of lost motion to a minimum in the connections between the element itself and the indicating and contact making parts of the mechanism, and this result I also seek to attain in the present construction.

The desired results I obtain by means of the constructions hereinafter described and illustrated in the accompanying drawings in which—

Figure 1:
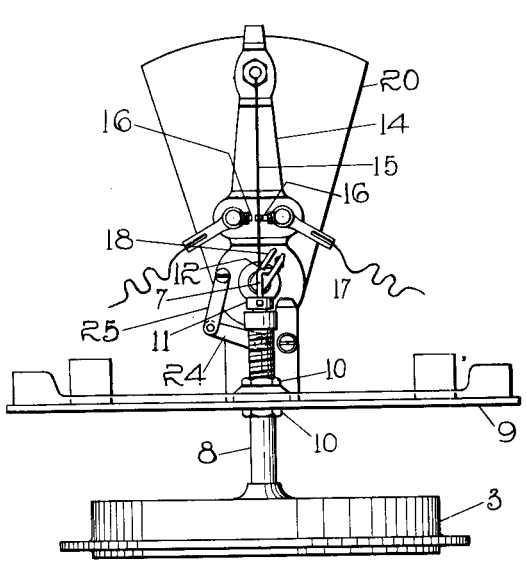
Figure 2:
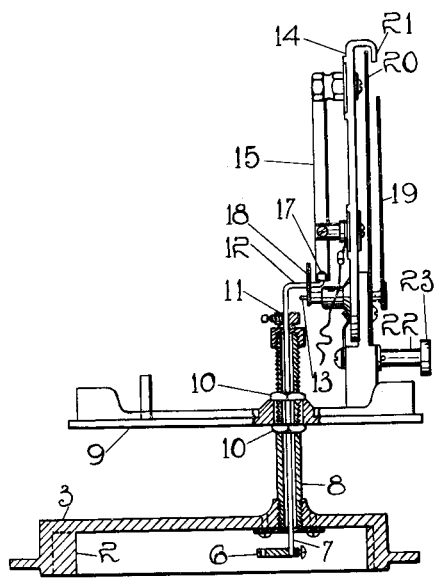
Figure 4:
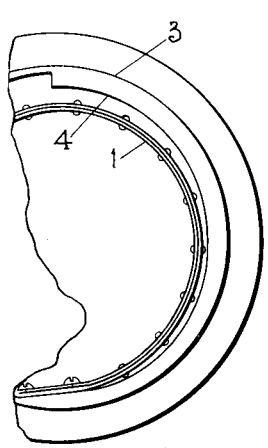
Figure 3:
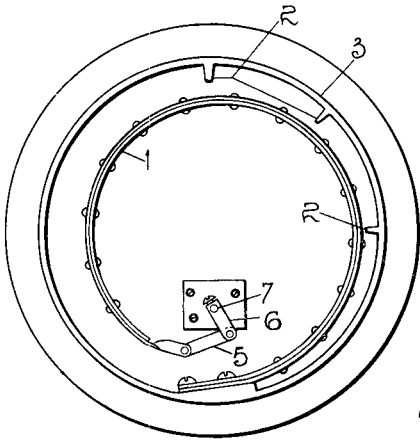
Figure 5:
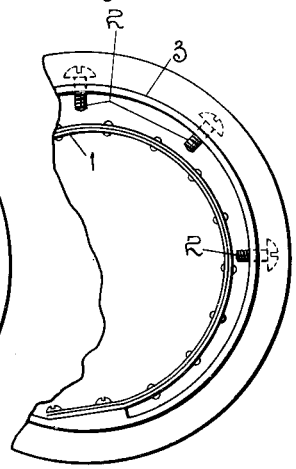

Figure 1 is a rear elevation of my improved apparatus; Fig. 2 a side elevation of the same partly in section; Fig. 3 a plan view of the underside thereof; and Figs. 4 and 5 plan views of modifications of the bi-metallic thermostatic element and its support.

In the drawings like numerals of reference indicate corresponding parts in the different figures of the drawings.

1 is the thermostatic element of the ordinary bi-metallic type preferably curved substantially in a spiral form.

To secure the desired result of a given rise in temperature causing equal movements of the indicating portion of the apparatus at different parts of the thermometric scale I provide behind the thermostatic element a series of abutments 2 at different distances from the fixed end of the element with which abutments the element contacts progressively as it expands and uncurls under the action of heat. While these abutments may be fixed lugs cast on the rim of the metal base 3 containing the element, they are preferably formed as screws screwed through the rim. This enables an adjustment to be effected to insure the accurate working of the element. If the element be accurately designed it is not absolutely essential that gaps be formed between the abutments as a single curved abutment 4 eccentric to the curve of the element may be employed. (See Fig. 4.) The best results, however, are likely to be obtained by means of the arrangement shown in Figs. 3 and 4. The free end of the thermostatic element is directly connected by a link 5 to a crank arm 6 secured to the lower end of the vertical spindle 7. This spindle is suitably journaled in the vertical tube 8 connected with the metal base 3. This tube supports the metal frame 9 carrying the other parts of the apparatus. The tube is shown as threaded and passing through the lower portion of the frame and clamped thereto by means of the nuts 10. The spindle 7 has a collar 11 secured thereto resting on the upper end of the tube 8. This collar determines the position of the spindle relative to the rest of the apparatus. The upper end of the spindle 7 is bent to form the crank arm 12.

Suitably journaled on a portion of the frame 9 and at right angles to the spindle 7 is the spindle 13. Concentric with this spindle is journaled the rock arm 14 to the outer end of which is secured one end of the spring contact finger 15. Either the rock arm must be made of insulating material or the contact finger carefully insulated therefrom. This contact finger is adapted to move between two contact pieces 16 suitably insulated from the arm. The spring contact finger normally engages one of the contacts and by the engagement of the crank arm on the spindle 7 is rocked into contact with the other contact when the thermostat is exposed to a predetermined temperature, this temperature being determined by rocking the aforesaid rock arm to a corresponding position. The end of the crank arm 12 is preferably bent upward and provided with an insulating button 17 which engages the contact finger. On the spindle 13 is secured a crank arm 18. One of the crank arms 12 and 18 is slotted for engagement with the other crank arm. Preferably it is the the crank arm 18 which is slotted, and through this slot passes the crank arm 12, thus the crank arm 12 actuates both the spindle 13 and the spring contact finger 15. The spindle 13 carries the index hand 19 which is moved over the index dial 20 to indicate the temperature to which the thermostat is exposed. The rock arm 14 also carries a pointer 21 bent over the face of the dial 20 as shown. By moving the rock arm until this pointer comes opposite the desired temperature the thermostat is set. The rock arm is angularly adjusted to set the device by means of the suitably journaled spindle 22 provided with the knob 23 or other suitable finger grip. This spindle has a crank arm 24 secured thereto connected with a rock arm by means of the link 25 pivoted on the crank arm and on the rock arm itself eccentric to the center on which the rock arm oscillates.

With a construction such as described it will be seen that the number of movable parts is reduced to a minimum thus reducing friction and lost motion which interfere with the proper action of thermostats of the same general type. I have also overcome the weakness of bi-metallic thermostatic elements referred to in the preamble to this specification.

What I claim as my invention is:—

1. In thermostatic apparatus a bi-metallic thermostatic element fixed at one end in combination with a plurality of fixed abutments adapted to be successively engaged by said element as it bends under the action of heat.

2. In thermostatic apparatus a bi-metallic thermostatic element fixed at one end in combination with a plurality of fixed abutments adjustable to and from and adapted to be successively engaged by said element as it bends under the action of heat.

3. In thermostatic apparatus a curved thermostatic element tending to straighten under the influence of increases in temperature in combination with a plurality of abutments adapted to be successively engaged by said element as its curvature decreases.

4. In thermostatic apparatus a thermostatic element tending to bend under the influence of increases in temperature in combination with a spindle; connections whereby the movements of the said element are transmitted to said spindle; a rock arm journaled on an axis substantially at right angles to the said spindle; contact make and break mechanism carried by said arm including a contact finger; and a crank arm on the aforesaid spindle adapted to engage and actuate the contact finger.

5. In thermostatic apparatus a thermostatic element tending to bend under the influence of increases in temperature in combination with a spindle; connections whereby the movements of the said element are transmitted to said spindle; an index spindle journaled on an axis substantially at right angles to the aforesaid spindle; a crank arm on said index spindle; and a crank arm on the spindle of the thermostatic element, one of the said crank arms on the two spindles being slotted for engagement by the other crank arm.

6. In thermostatic apparatus a thermostatic element tending to bend under the influence of increases in temperature in combination with a spindle; connections whereby the movements of the said element are transmitted to said spindle; an index spindle journaled on an axis substantially at right angles to the aforesaid spindle; a crank arm on said index spindle; a crank arm on the spindle of the thermostatic element, one of the said crank arms on the two spindles being slotted for engagement by the other crank arm; a rock arm journaled concentric with said index spindle; and contact make-and-break mechanism carried by said arm including a contact finger, the crank arm on the spindle of the contact being adapted to actuate the contact finger.

7. In thermostatic apparatus a thermostatic element tending to bend under the influence of increases in temperature in combination with a spindle; connections whereby the movements of the said element are transmitted to said spindle; contact make-and-break mechanism including a contact finger; index mechanism; and a crank arm on the aforesaid spindle adapted to directly engage and actuate both the contact finger and the index mechanism.

8. In thermostatic apparatus a thermostatic element tending to bend under the influence of increases in temperature in combination with a spindle; connections whereby the movements of the said element are transmitted to said spindle; contact make-and-break mechanism including a contact finger; index mechanism; a crank arm on the aforesaid spindle adapted to directly engage and actuate both the contact finger and the index mechanism; and means for shifting the position of the contact make-and-break mechanism relative to the said crank arm to vary the temperature at which contact mechanism is operated.

9. In thermostatic apparatus a thermostatic element tending to bend under the influence of increases in temperature in combination with a spindle; connections whereby the movements of the said element are transmitted to said spindle comprising a crank secured to the spindle and a link pivotally secured to the thermostatic element and the said crank; contact make-and-break mechanism including a contact finger; index mechanism; and a crank arm on the aforesaid spindle adapted to directly engage and actuate both the contact finger and the index mechanism.

10. In thermostatic apparatus a bi-metallic thermostatic element fixed at one end in combination with fixed means so located relative to the element as to form a backing for said element at progressively increasing distances from the fixed end thereof as the element bends under the action of heat.

11. In thermostatic apparatus the combination of a spindle adapted to be rocked by a thermostatic element; a rock arm; a rock arm journaled at right angles to said spindle; contact means carried thereby; a contact arm secured to said rock arm distant from its journal and adapted to engage or disengage from said contact means; an arm on the spindle adapted to engage and move the contact finger; and means for angularly adjusting the rock arm.

12. In thermostatic apparatus the combination of a spindle adapted to be rocked by a thermostatic element: a rock arm; a rock arm journaled at right angles to said spindle; contact means carried thereby; a contact arm including a spring, secured to said rock arm distant from its journal and adapted to engage or disengage from said contact means; an arm on the spindle adapted to engage and move the contact finger; and means for angularly adjusting the rock arm.

13. In thermostatic apparatus the combination of a spindle adapted to be rocked by a thermostat; a suitably journaled rock arm; a pair of contacts carried by said arm; a contact arm carried by said rock arm adapted to contact with either contact and normally yieldingly held in contact with one of them; an arm fixed to the spindle and adapted when the spindle is rocked to engage the said contact finger to move it toward the second contact; and means for angularly adjusting the rock arm.

14. In thermostatic apparatus the combination of a spindle adapted to be rocked by a thermostat; a suitably journaled rock arm; a pair of contacts carried by said arm; a contact arm carried by said rock arm adapted to contact with either contact and normally yieldingly held in contact with one of them; an arm fixed to the spindle and adapted when the spindle is rocked to engage the said contact finger to move it toward the second contact; and means for angularly adjusting the rock arm comprising a spindle extending forwardly of the aforesaid rock arm, a crank arm on the spindle and a pivoted link connecting said crank arm with the rock arm.

15. In thermostatic apparatus, the combination of a spindle adapted to be rocked by a thermostat; a suitably journaled rock arm; a pair of contacts carried by said arm; a contact arm including a spring by means of which it is secured to the rocking arm which tends to yieldingly hold it in contact with one of the contacts; an arm fixed to the spindle and adapted when the spindle is rocked to engage the said contact finger to move it toward the second contact; and means for angularly adjusting the rock arm.

16. In thermostatic apparatus, the combination of a spindle adapted to be rocked by a thermostat; a suitably journaled rock arm; a pair of contacts carried by said arm; a contact arm suitably supported to play between said contacts and normally yieldingly held in contact with one of them, said contact arm being movable with the rock arm; an arm fixed to the spindle and adapted when the spindle is rocked to engage the said contact finger to move it toward the second contact, and means for angularly adjusting the rock arm comprising a spindle extending forwardly of the aforesaid rock arm, a crank arm on the spindle and a pivoted link connecting said crank arm with the rock arm.

Toronto, Ont., this nineteenth day of November, A. D. 1913.

GEORGE J. OGDEN.

Signed in the presence of—
E. P. HALL,
E. LAW.